United States Patent Office 2,777,847
Patented Jan. 15, 1957

2,777,847
PRODUCTS

Christoph J. Grundmann and Alfred Kreutzberger, Columbus, Ohio, assignors to Olin Mathieson Chemical Corporation, a corporation of Virginia No Drawing. Application June 25, 1954,
Serial No. 439,462

4 Claims. (Cl. 260—248)

This invention relates to 1,3,5-triazine perbromides.
The novel compounds of this invention can be prepared from substituted and unsubstituted 1,3,5-triazine by bromination of the triazine in an inert solvent at relatively low temperatures, i. e., from about −15° C. to about +20° C. The new compounds are usually orange colored solids of relatively low melting point. They are, for the most part, readily decomposed by atmospheric moisture but are stable when kept in a desiccated atmosphere. Some of the triazine perbromides of this invention contain two active bromine atoms while triazine itself forms a perbromide containing three bromine atoms. The novel compounds of this invention are useful as brominating agents in general and also for the treatment of water.

We have found that perbromides can be prepared from 1,3,5-triazine itself and from 1,3,5-triazine substituted with alkyl groups and aromatic groups. Alkyl groups which may be present include: methyl, ethyl, propyl, butyl, etc. Aromatic groups which may be present include: phenyl, chlorophenyl, tolyl, etc.

The chloride compounds corresponding to the perbromides of this invention may also be prepared by an analogous method. The perchlorides are, in general, much less stable than the perbromides and consequently are more difficult to isolate in atmospheric environment.

The invention will be further illustrated by the following examples:

*Example I*

A solution of 2.6 grams (0.0162 mole) of bromine dissolved in 10 ml. of dry carbon tetrachloride was added dropwise to a solution of two grams (0.0108 mole) of 2-phenyl-4, 6-dimethyl-1,3,5-triazine in 20 ml. of dry carbon tetrachloride cooled in ice. After complete addition of the bromine solution, orange needles began to separate. The solution was allowed to stand for several days in an ice box. The needles were filtered, washed quickly with a small amount of carbon tetrachloride and dried in a desiccator over phosphorus pentoxide. The yield was 93.3% of theory of 2-phenyl-4,6-dimethyl-1,3,5-triazine perbromide, $C_{11}H_{11}N_3Br_3$. Analysis for total bromine content showed 47.7 and 48.4% bromine; the calculated value being 46.3%. Iodometric titration indicated 45.9% bromine; substantially the total bromine content.

*Example II*

A solution of 3.9 grams (0.0245 mole) of bromine in 10 ml. of carbon tetrachloride was added with stirring to a well cooled solution of 2 grams (0.0162 mole) of 2,4,6-trimethyl-1,3,5-triazine in 20 ml. of dry carbon tetrachloride. Orange crystals formed in the solution after a short time. The mixture was kept in an ice box for several days, filtered with suction, and the product washed with cold dry carbon tetrachloride. The total bromine content of the product was found to be 56.48% as compared with a calculated value of 56.5% based on 2,4,6-trimethyl-1,3,5-triazine perbromide, $C_6H_9N_3Br_2$.

*Example III*

A solution of 19 grams (0.118 mole) of bromine in 40 ml. of anhydrous carbon tetrachloride was added dropwise with stirring to an ice cold solution of 3 grams (0.037 mole) of 1,3,5-triazine in 40 ml. of anhydrous carbon tetrachloride. An orange crystalline solid precipitated after a short time. The mixture was allowed to stand for several days in an ice box. The precipitate was filtered with suction and washed quickly with a small amount of dry carbon tetrachloride. The product was further purified by sublimation at atmospheric pressure above a bath maintained at 40 to 50° C. Bright orange crystals having a melting point of 70° C. were obtained. The total bromine content of the product was found to be 75.05% as compared with a calculated value of 74.75% based on the formula $C_3H_3N_3.Br_3$. Iodometric titration showed the total bromine content to be active bromine.

The procedure of Example I can also be employed to prepare 2-chlorophenyl-4,6-diethyl-1,3,5-triazine perbromide, 2-tolyl-4-methyl-6-ethyl-1,3,5-triazine perbromide, 2-phenyl-4,6-dibutyl-1,3,5-triazine perbromide, etc.

The specific examples disclosed are for illustration only and are not to be construed as limiting the scope of the invention.

We claim:

1. Perbromides of the 1,3,5-triazine selected from the group consisting of the perbromide of 1,3,5-triazine and perbromides of 1,3,5-triazine represented by the following formula:

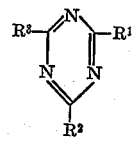

where $R^1$ is selected from the group consisting of lower alkyl groups having 1–4 carbon atoms, phenyl, chlorophenyl and tolyl and $R^2$ and $R^3$ are lower alkyl groups having 1–4 carbon atoms.

2. 2-phenyl-4,6-dimethyl-1,3,5-triazine perbromide.
3. 2,4,6-trimethyl-1,3,5-triazine perbromide.
4. 1,3,5-triazine perbromide.

References Cited in the file of this patent

UNITED STATES PATENTS 2,184,883   Muskat _____ Dec. 26, 1939